UNITED STATES PATENT OFFICE.

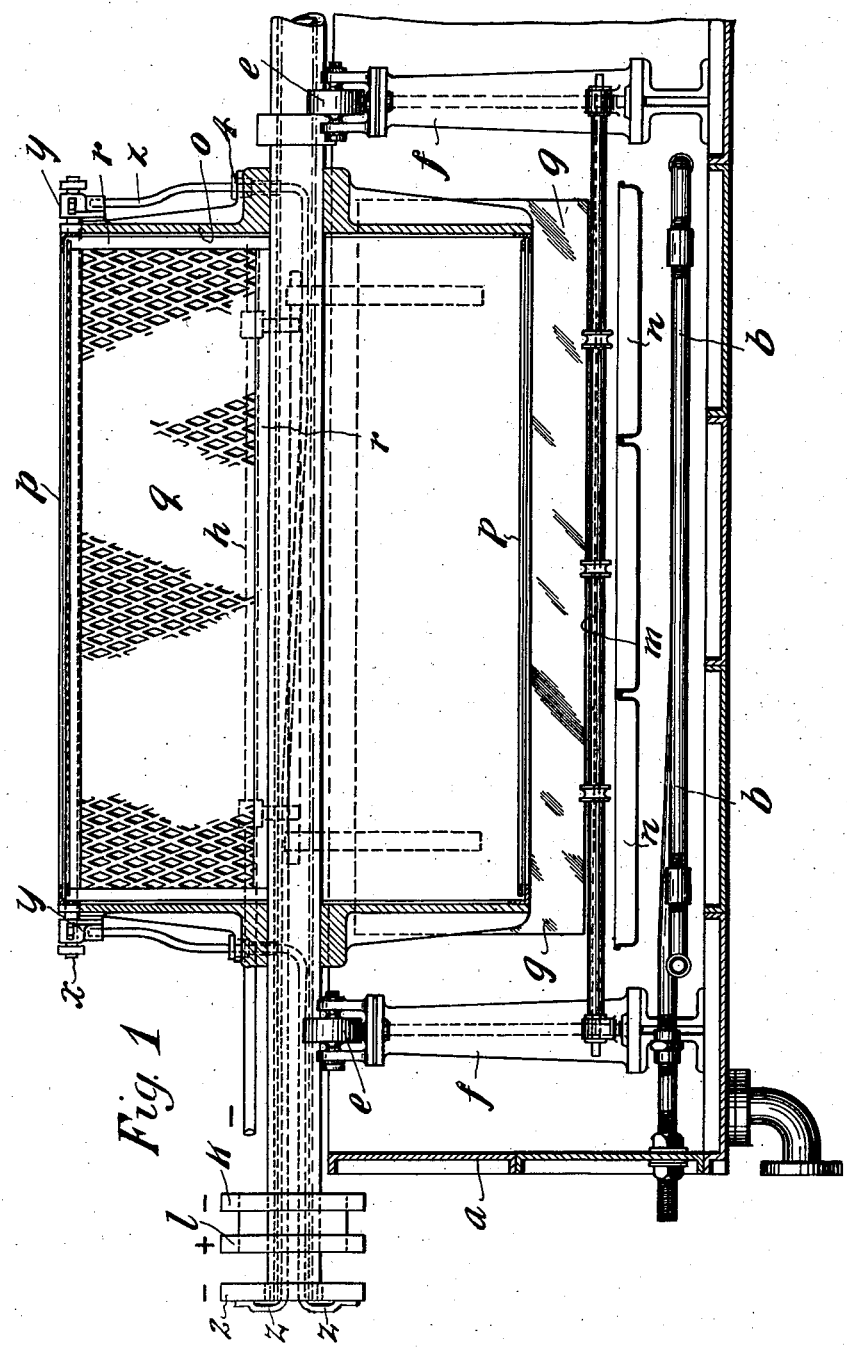

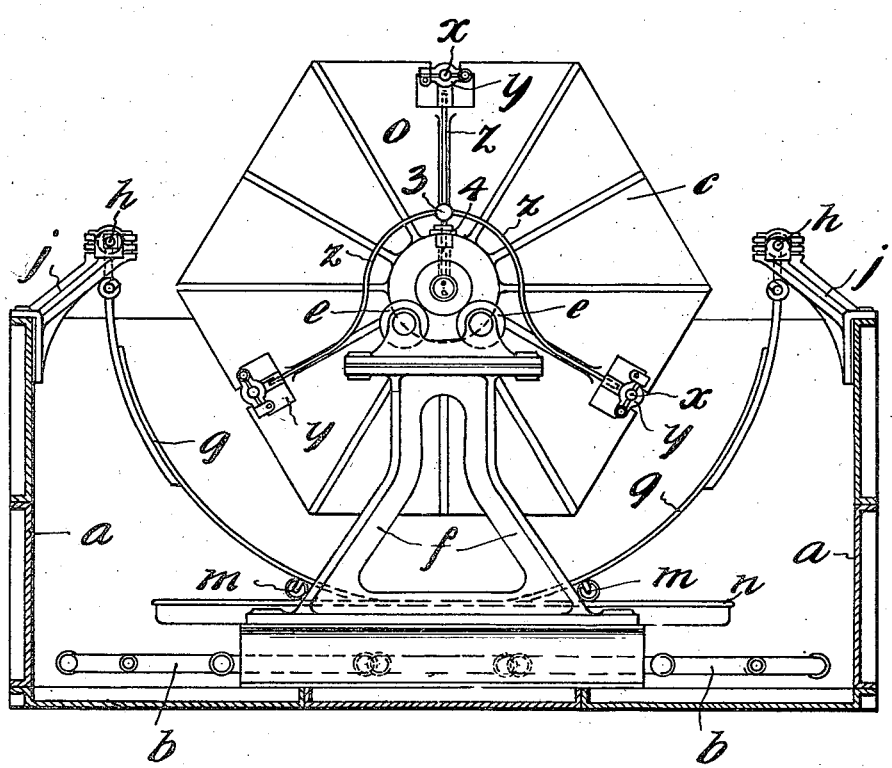

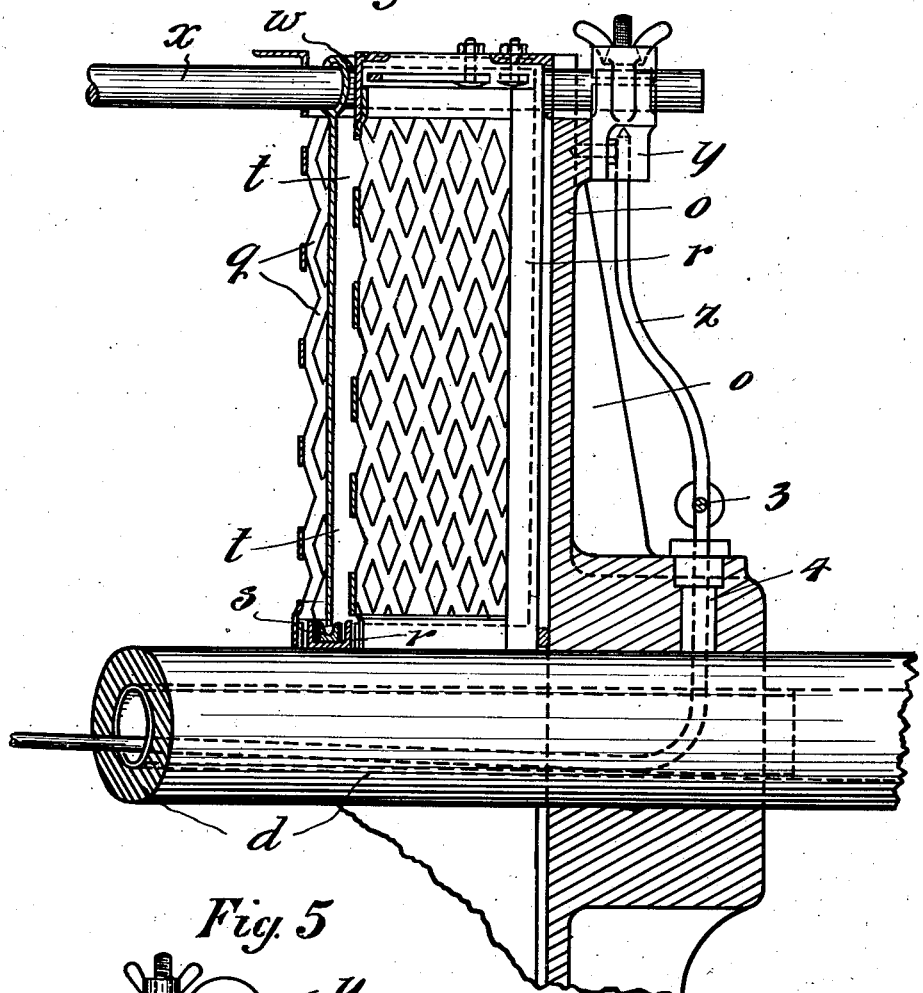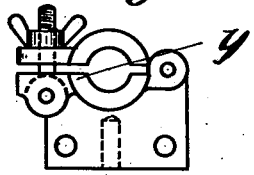

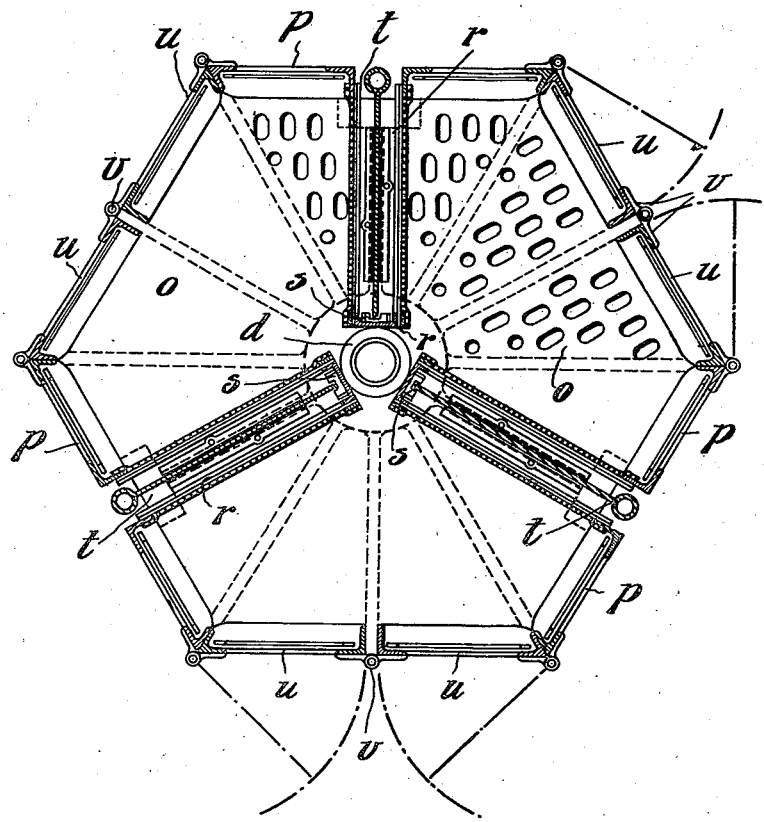

CECIL MONTAGUE WALTER, OF FOUR OAKS, NEAR BIRMINGHAM, ENGLAND.

ELECTROLYTIC APPARATUS.

1,353,194.  Specification of Letters Patent.  Patented Sept. 21, 1920.

Application filed June 12, 1919. Serial No. 303,637.

*To all whom it may concern:*

Be it known that I, CECIL MONTAGUE WALTER, B. Sc. of "Lyvden," Lichfield Road, Four Oaks, near Birmingham, England, engineer, have invented certain new and useful Improvements in and Relating to Electrolytic Apparatus.

This invention relates to electrolytic apparatus and is more particularly intended for the treatment of tinned scrap and tinned articles of all kinds for the recovery of the metals.

Electrolytic apparatus for this and like purposes is well known in which a drum for containing the scrap or anode material is rotated in a vat containing a suitable electrolyte and with cathode plates suspended therein. In some cases the drum has been removable and a portion, or portions, of its surface has been removable to permit charging or discharging to be performed.

One of the objects of my invention is to enable cathode plates to be disposed to better advantage in relation to the body of scrap or anode material within the drum.

Accordingly my invention consists in a drum in which cathode plates are arranged projecting internally and extending longitudinally, that is in the direction of the axis about which the drum rotates. Preferably the cathode plates are arranged radially and divide the drum into two or more longitudinal compartments, suitable screens of expanded metal, gauze, or other materials permitting free access of the electrolyte to the cathode, being arranged on each side of each cathode to prevent the scrap or anode material from contacting with the cathode.

Figure 1 is a sectional elevation of the apparatus.

Fig. 2 is a sectional end view thereof.

Fig. 3 shows in section a portion of one end of the drum drawn to a larger scale.

Fig. 4 is a transverse sectional view of the drum.

Fig. 5 is a detail of a device used in arrangement for leading current to the internal cathodes.

In this example $a$ is a vat shown as adapted for steam heating by pipes $b$ and $c$ is the drum with a hollow axle $d$ supported on bearings $e$ on standards $f$. External cathodes $g$ are arranged in the vat each suspended from a rod $h$ supported in brackets $j$ from the vat to which rod current is led from the slip ring or like means $k$. A second slip ring $l$ leads current to the drum axle $d$ and so to the drum and the anode material contained therein.

The cathodes $g$ may be curved or inclined to conform more nearly to the drum and their lower end may be supported on rollers or rods $m$, see Fig. 2. A tray below the drum is represented at $n$. The drum is shown with substantial end plates $o$ suitably perforated and these may be of spider form, of hexagonal shape on which is arranged expanded metal, gauze, or other suitably perforated sides $p$ for the drum. At three equidistant points the drum is divided by means of screens $q$ for example of expanded metal secured to suitable angle or other frame members along the axle and down each end plate trough members $r$ may be secured, and within these insulating members $s$ of porcelain, porcelain enamel, or other suitable material may be secured and into the gutters or guides in these members $s$ cathode plates $t$ may be slid.

By means of the cathode plates and screens the drum is thus divided into longitudinal compartments (three being shown) and to these compartments suitable openings for charging and discharging must be provided. As an example at one side of each hinged members $u$ Fig. 4 may be arranged, with any suitable fastening such as a rod through intermeshing eye plates $v$.

Any suitable means for leading current to the internal cathode plates $t$ may be followed. As one example each plate is shown with a rolled edge $w$ in which a rod $x$ is arranged which projects at the ends and is embraced by clips $y$ secured to the end plates of the drum but insulated therefrom. The construction of the clips $y$ is shown at Figs. 3 and 5. Into the clips $y$ we may secure copper rods $z$ forming conductors and connected to a slip ring 2. In tne illustrated construction three rods $z$ are united at 3 (Fig. 2) and from the junction a lead is carried at each end of the drum through an insulating sleeve 4 into the insulated bore of the axle $d$ and so to the slip ring 2.

If desired instead of a removable drum for charging and discharging purposes I may provide a removable basket or lining for each compartment.

With this arrangement a number of cathode plates may be disposed in one drum so that each plate has both its surfaces exposed for deposition. The cathode is within the mass or general body of the scrap within the drum, although the latter is prevented from contacting with it, and each cathode plate is readily removable and replaceable so that the tin oxid or the like deposited therein can be recovered.

The arrangement is a very convenient one for working, and lends itself for application to large plants and large quantities of scrap can be dealt with and detinned in a more rapid manner than hitherto.

It will be understood that my invention is not restricted to the particular constructional details given but comprises the provision within the anode drum itself of removable longitudinally disposed cathode plates or members suitably protected from the anode material within the drum or container.

I claim—

1. Electrolytic apparatus comprising a fixed vat for containing the electrolyte, a container drum for the material to be treated, said drum being rotatable in said vat, internally projecting cathode plates arranged in said drum, said plates being longitudinally disposed, and means for retaining the said material out of contact with said plates while permitting ready access for the electrolyte to the plates.

2. Electrolytic apparatus for detinning processes comprising a fixed vat for the electrolyte, a rotatable container drum therein for the anode material under treatment, internal cathode plates radially and longitudinally disposed in said drum, permeable means for preventing the said anode material from contacting with said plates, said plates and said permeable means dividing the drum into a plurality of compartments.

3. Electrolytic apparatus for detinning processes comprising in combination a liquid vat and a container drum rotatable therein, said drum being polygonal and of perforate form, and divided into compartments by perforate screens and with cathode plates secured in the divisions and protected from the anode material in the drum by the screens.

4. Electrolytic apparatus as in claim 1, in which external cathodes are also employed substantially as set forth.

5. Electrolytic apparatus for detinning processes comprising a vat for the electrolyte, a container drum of perforate form rotatable in said vat, said drum being divided into compartments, radial cathode plates between screens at the divisions of the drum, said cathode plates being retained by conductor rods engaged in clips secured to the end plates of the drum, and current leads connected to the clips.

6. Electrolytic apparatus for detinning processes comprising a fixed vat for the electrolyte, a rotatable container drum therein for the anode material under treatment, internal cathode plates radially and longitudinally disposed in said drum, permeable means for preventing the said anode material from contacting with said plates, said plates and said permeable means dividing the drum into a plurality of compartments, and a removable permeable basket or lining in each compartment of the drum to contain the anode material.

In testimony whereof I affix my signature.

CECIL MONTAGUE WALTER.